(12) United States Patent
Gailey et al.

(10) Patent No.: US 7,254,384 B2
(45) Date of Patent: Aug. 7, 2007

(54) MULTI-MODAL MESSAGING

(75) Inventors: Michael L. Gailey, Dunwoody, GA (US); Eric A Portman, Norcross, GA (US); Michael J. Burgiss, Smyrna, GA (US)

(73) Assignee: Accenture Global Services GmbH, Schaffhausen (CH)

( * ) Notice: Subject to any disclaimer, the term of this patent is extended or adjusted under 35 U.S.C. 154(b) by 183 days.

(21) Appl. No.: 10/263,523

(22) Filed: Oct. 3, 2002

(65) Prior Publication Data

US 2003/0064709 A1 Apr. 3, 2003

Related U.S. Application Data

(60) Provisional application No. 60/326,835, filed on Oct. 3, 2001.

(51) Int. Cl.
*H04M 11/10* (2006.01)
(52) U.S. Cl. .................. 455/412; 455/413; 455/414.1; 455/414.2; 455/422.1; 455/456.1; 455/456.3; 455/466; 379/88.17; 709/218; 704/275
(58) Field of Classification Search ............... 455/412, 455/413, 414, 415, 414.2, 422.1, 432.1, 456.1, 455/456.3, 466, 412.1; 379/88.01, 88.02, 379/88.03, 88.04, 88.13, 88.14, 88.17; 709/224, 709/218, 275
See application file for complete search history.

(56) References Cited

U.S. PATENT DOCUMENTS 5,561,769 A 10/1996 Kumar et al.
5,675,507 A 10/1997 Bobo, II (Continued)

FOREIGN PATENT DOCUMENTS

DE 197 56 851 A1 7/1999

(Continued)

OTHER PUBLICATIONS

"Digital cellular telecommunications system (Phase 2+) (GSM); Universal Mobile Telecommunications System (UMTS); Functional stage 2 description of location services (3 GPP TS 23.271 version 5.2.0 Release 5); ETSI TS 123 271" ETSI Standards, European Tellecommunication Standards Institute; Sophia-Antipo, FR, vol. 3-SA2, No. V520, Mar. 2002 XP014007890.

*Primary Examiner*—Fan Tsang
*Assistant Examiner*—Md. S. Elahee
(74) *Attorney, Agent, or Firm*—Brinks Hofer Gilson & Lione

(57) ABSTRACT

A system and method for providing multi-modal messaging for a wireless communication system. A wireless terminal is connected to a wireless access network, wherein the wireless terminal is capable of generating a voice request. A multi-modal message server is connected to the wireless access network for receiving the voice request generated by a user of the remote terminal. A voice recognition application is operable to identify words contained in the voice request. A response generation application uses the identified words to generate a response to the voice request. A unified messaging application is operable to interpret the response and generate a first and second response that is based on the contents of the response generated by the response generation application. The first and second responses are then transmitted to the wireless terminal in different communication formats.

36 Claims, 2 Drawing Sheets

U.S. PATENT DOCUMENTS

| | | | |
|---|---|---|---|
| 5,764,762 A | 6/1998 | Kazmierczak et al. | |
| 5,850,517 A | 12/1998 | Verkler et al. | |
| 5,862,325 A | 1/1999 | Reed et al. | |
| 5,870,549 A | 2/1999 | Bobo, II | |
| 5,884,262 A | 3/1999 | Wise et al. | 704/270 |
| 5,905,736 A | 5/1999 | Ronen et al. | |
| 5,920,835 A | 7/1999 | Huzenlaub et al. | |
| 5,953,392 A | 9/1999 | Rhie et al. | |
| 6,052,367 A | 4/2000 | Bowater et al. | |
| 6,070,189 A * | 5/2000 | Bender et al. | 709/224 |
| 6,119,167 A | 9/2000 | Boyle et al. | |
| 6,138,158 A | 10/2000 | Boyle et al. | |
| 6,157,941 A | 12/2000 | Verkler et al. | |
| 6,161,139 A | 12/2000 | Win et al. | |
| 6,173,259 B1 | 1/2001 | Bijl et al. | |
| 6,181,781 B1 | 1/2001 | Porter et al. | |
| 6,182,142 B1 | 1/2001 | Win et al. | |
| 6,182,144 B1 | 1/2001 | England | |
| 6,219,638 B1 | 4/2001 | Padmanabhan et al. | |
| 6,236,768 B1 * | 5/2001 | Rhodes et al. | 382/306 |
| 6,249,291 B1 | 6/2001 | Popp et al. | |
| 6,263,358 B1 | 7/2001 | Lee et al. | |
| 6,282,270 B1 | 8/2001 | Porter | |
| 6,301,245 B1 | 10/2001 | Luzeski et al. | |
| 6,314,108 B1 | 11/2001 | Ramasubramani et al. | |
| 6,333,973 B1 * | 12/2001 | Smith et al. | 379/88.12 |
| 6,345,245 B1 | 2/2002 | Sugiyama et al. | |
| 6,385,586 B1 * | 5/2002 | Dietz | 704/277 |
| 6,393,467 B1 | 5/2002 | Potvin | |
| 6,453,337 B2 | 9/2002 | Miller et al. | |
| 6,473,612 B1 | 10/2002 | Cox et al. | |
| 6,483,899 B2 | 11/2002 | Agraharam et al. | |
| 6,504,910 B1 | 1/2003 | Engelke et al. | |
| 6,510,417 B1 | 1/2003 | Woods et al. | 704/275 |
| 6,513,003 B1 * | 1/2003 | Angell et al. | 704/235 |
| 6,516,316 B1 | 2/2003 | Ramasubramani et al. | |
| 6,523,063 B1 | 2/2003 | Miller et al. | |
| 6,546,005 B1 | 4/2003 | Berkley et al. | |
| 6,587,835 B1 * | 7/2003 | Treyz et al. | 705/14 |
| 6,594,348 B1 | 7/2003 | Bjurstrom et al. | 379/88.13 |
| 6,598,018 B1 | 7/2003 | Junqua | 704/251 |
| 6,647,257 B2 | 11/2003 | Owensby | |
| 6,697,474 B1 * | 2/2004 | Hanson et al. | 379/201.01 |
| 6,721,288 B1 | 4/2004 | King et al. | |
| 6,725,252 B1 | 4/2004 | Himmel et al. | |
| 6,726,758 B2 | 4/2004 | Sato | |
| 6,742,022 B1 | 5/2004 | King et al. | |
| 6,757,718 B1 * | 6/2004 | Halverson et al. | 709/218 |
| 6,775,360 B2 | 8/2004 | Davidson et al. | 379/86.14 |
| 6,782,253 B1 | 8/2004 | Shteyn et al. | |
| 6,782,419 B2 | 8/2004 | Tobita et al. | |
| 6,816,835 B2 | 11/2004 | Hayashi | 704/260 |
| 6,820,204 B1 | 11/2004 | Desai et al. | |
| 6,826,407 B1 | 11/2004 | Helferich | |
| 6,826,692 B1 | 11/2004 | White | |
| 6,829,334 B1 | 12/2004 | Zirngibl et al. | |
| 6,859,451 B1 | 2/2005 | Pasternack et al. | |
| 6,895,084 B1 * | 5/2005 | Saylor et al. | 379/88.22 |
| 6,907,112 B1 | 6/2005 | Guedalia et al. | |
| 6,912,582 B2 | 6/2005 | Guo et al. | |
| 6,925,307 B1 * | 8/2005 | Mamdani et al. | 455/466 |
| 6,950,947 B1 | 9/2005 | Purtell et al. | |
| 7,020,251 B2 * | 3/2006 | Zirngibl et al. | 379/88.17 |
| 2002/0035607 A1 | 3/2002 | Checkoway et al. | |
| 2002/0049907 A1 | 4/2002 | Woods et al. | |
| 2002/0055351 A1 | 5/2002 | Elsey et al. | |
| 2002/0068551 A1 | 6/2002 | Strunk et al. | |
| 2002/0091829 A1 | 7/2002 | Wood et al. | |
| 2002/0107925 A1 | 8/2002 | Goldschneider et al. | |
| 2002/0112007 A1 | 8/2002 | Wood et al. | |
| 2002/0119793 A1 * | 8/2002 | Hronek et al. | 455/466 |
| 2002/0137491 A1 * | 9/2002 | Pentikainen et al. | 455/412 |
| 2003/0008661 A1 * | 1/2003 | Joyce et al. | 455/456 |
| 2003/0065620 A1 | 4/2003 | Gailey et al. | |

FOREIGN PATENT DOCUMENTS

| | | |
|---|---|---|
| WO | WO 99/55049 A1 | 10/1999 |
| WO | WO 00/17854 A1 | 3/2000 |
| WO | WO 01/69422 A2 | 9/2001 |

* cited by examiner

MULTI-MODAL MESSAGING

This application claims the benefit under 35 U.S.C. § 119 of U.S. Provisional Application Ser. No. 60/326,835 filed on Oct. 3, 2001 and entitled Multi-Modal Messaging.

FIELD OF THE INVENTION

The present invention relates to mobile communication and more particularly, to a method and system for communicating with a terminal over an access network using multiple communication modes during a single business transaction or interaction.

BACKGROUND OF THE INVENTION

Wireless communication devices have recently evolved from a technology used by an elite segment of the population to a technology that is used by the masses. Worldwide, the number of wireless communication device users has reached a staggering number and is growing all of the time. In the near future, it is envisioned that almost everyone will own or use some sort of wireless communication device that is capable of performing a variety of functions. In addition to traditional wireless communication devices, many different types of portable electronic devices are in use today. In particular, notebook computers, palm-top computers, and personal digital assistants (PDA) are commonplace.

Users of wireless telephones and other wireless devices have recently been able to place a phone call to an automated system to request information by speaking to a basic automated speech recognition system. The basic automated speech recognition system typically responds to the caller using text-to-speech and/or recorded speech prompts. This method of information delivery is cumbersome and challenging for the caller as well as very time consuming, thereby causing callers unnecessary frustration. In some cases, the system returns too much information and the caller must listen to the entire response in order to get the information they want. In other systems the caller must verbally navigate through a deep hierarchy of prompts to get to the specific piece of information they seek.

As such, a need exists for a system that is capable of providing a structured response to a user request that takes advantage of voice and text enabled wireless communication devices to provide easy user interaction.

SUMMARY OF THE INVENTION

The present invention discloses a multi-modal messaging system that preferentially takes advantage of text messaging enabled wireless terminals, but may also be used with computer terminals. The multi-modal messaging system accepts simple speech requests from wireless terminals and provides verbose a text response. In this case the user can quickly scan the message for the specific information they desire. Further, the information provided in the text response persists after the voice call has been terminated, which is advantageous compared to speech-only systems that rely on the users memory or require jotting notes on paper to store the information provided. The present invention enables users of voice and text enabled wireless terminals connected to a wireless network to communicate with a business system also connected to the wireless network via both voice and text messages during the course of a single interaction.

A preferred embodiment of the present invention discloses a multi-modal messaging system for a wireless communication system. The multi-modal messaging system includes a wireless terminal connected to a wireless access network. The wireless terminal is operable to generate a voice request for information. A multi-modal message server is connected to the wireless access network for receiving the voice request for information from the wireless terminal. A voice recognition application of the multi-modal messaging server is operable to identify a plurality of words contained in the voice request for information. A response generation application is operable to generate a first and second response to the voice request for information. Preferentially, the first and second responses are in a first and second message format. Once generated by the multi-modal message server, the first and second responses are transmitted to the wireless terminal.

In the preferred embodiment of the present invention, the voice request for information is in the form of a natural language statement A natural language processing application is included that is operable to interpret an intent associated with the voice request for information. In other embodiments, a location information application for generating a geographic location indication of the wireless terminal is included in the multi-modal messaging system. The first and second responses are based at least in part on the geographic location indication of the wireless terminal.

A virtual customer database may also be connected to the multi-modal message server for providing a profile associated with the user of the wireless terminal. The profile preferentially includes a customer identification and a device characteristic indication. The device characteristic indication allows the first and second responses to be generated in a format that is compatible with the wireless terminal. A transcoding application may also be included for formatting the text-based responses into a protocol capable of being displayed on a display of the wireless terminal in a format that is compatible with the display of the wireless terminal. This allows the text-based information to be displayed in an optimal fashion on the display of the wireless terminal.

As set forth above, the preferred embodiment of the present invention allows users of wireless terminals to receive responses to requests for information that include more than one mode of communication. This provides users with ease of access to the information that is provided as well as a record of what information they received, thereby allowing users to not have to remember through the use of memory each item stated during an interaction with the multi-modal messaging system. The first and second responses that are provided to users may be selected from a group of responses consisting of a voice-based response, a text-based response, a voice-mail response, an instant message response, an email response or a fax response.

Another preferred embodiment of the present invention discloses a method of providing multi-modal messages in a wireless communication system. In this preferred embodiment, a voice request for information is generated using a wireless terminal. The voice request for information is then transmitted to a multi-modal message server. The multi-modal message server then identifies a plurality of words contained in the voice request for information. A first and second response is then generated to the voice request for information that is based at least in part on the identity of the words. After the first and second responses are generated, they are transmitted to the wireless terminal by the multi-modal message server.

The first response to the request for information is preferentially a voice-based response. A text-to-speech application associated with the multi-modal message server is used to generate the voice-based responses that are sent to the wireless terminals. In addition, the first and second responses that are generated can be predefined by a user preference indication contained in a virtual customer database that is associated with the multi-modal message server. The virtual customer database may be located on the multi-modal message server or located on a server that is connected with the multi-modal message server.

Another preferred embodiment of the present invention discloses a method of providing multi-modal messages in a wireless communication system. In this embodiment of the present invention, a natural language voice request for information is generated using a wireless terminal. The natural language voice request for information is then transmitted to a multi-modal message server. A plurality of words contained in the natural language voice request for information is then identified by the multi-modal message server. An intent associated with the plurality of words contained in the natural language voice request for information is then determined by the multi-modal message server. A response to the voice request for information is then generated based at least in part on the identity and intent of the words. The response is then transformed into a first and second message format and then transmitted to the wireless terminal.

Yet another preferred embodiment discloses a multi-modal messaging system for a wireless communication system. The multi-modal messaging system includes a wireless terminal connected to a wireless access network, wherein the wireless terminal is operable to generate a natural language voice request for information. A multi-modal message server connected to the wireless access network for receiving the natural language voice request for information from the wireless terminal. A voice recognition application associated with the multi-modal message server is operable to identify a plurality of words contained in the natural language voice request for information. A natural language processing application associated with the multi-modal message server is operable to determine an intent associated with the words identified in said natural language voice request for information. A response generation application is operable to generate a response to the natural language voice request for information that is based at least in part on the identity of the words and the intent of the words. A unified messaging application associated with the multi-modal message server is operable to interpret the response and generate a first response in a first message format and a second response in a second message format that are transmitted to the wireless terminal.

Another preferred embodiment discloses a method of providing multi-modal messages in a communication system. In this preferred method, a request for information is generated with a terminal, which is then transmitted via an access network to a multi-modal message server. A response to the request for information is then generated by the multi-modal message server. The response is then formatted into a first message format and a second message format and then transmitted to the terminal using an access network.

Yet another preferred embodiment discloses a multi-modal messaging system for a communication system. The preferred multi-modal messaging system includes a terminal that is connected to an access network, wherein the terminal is operable to generate a request for information. A multi-modal message server is connected to the access network for receiving the request for information once sent by the terminal. A response generation application located on the multi-modal message server is operable to generate a first and second response to the request for information. The first and second responses are then transmitted to the terminal via the access network.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
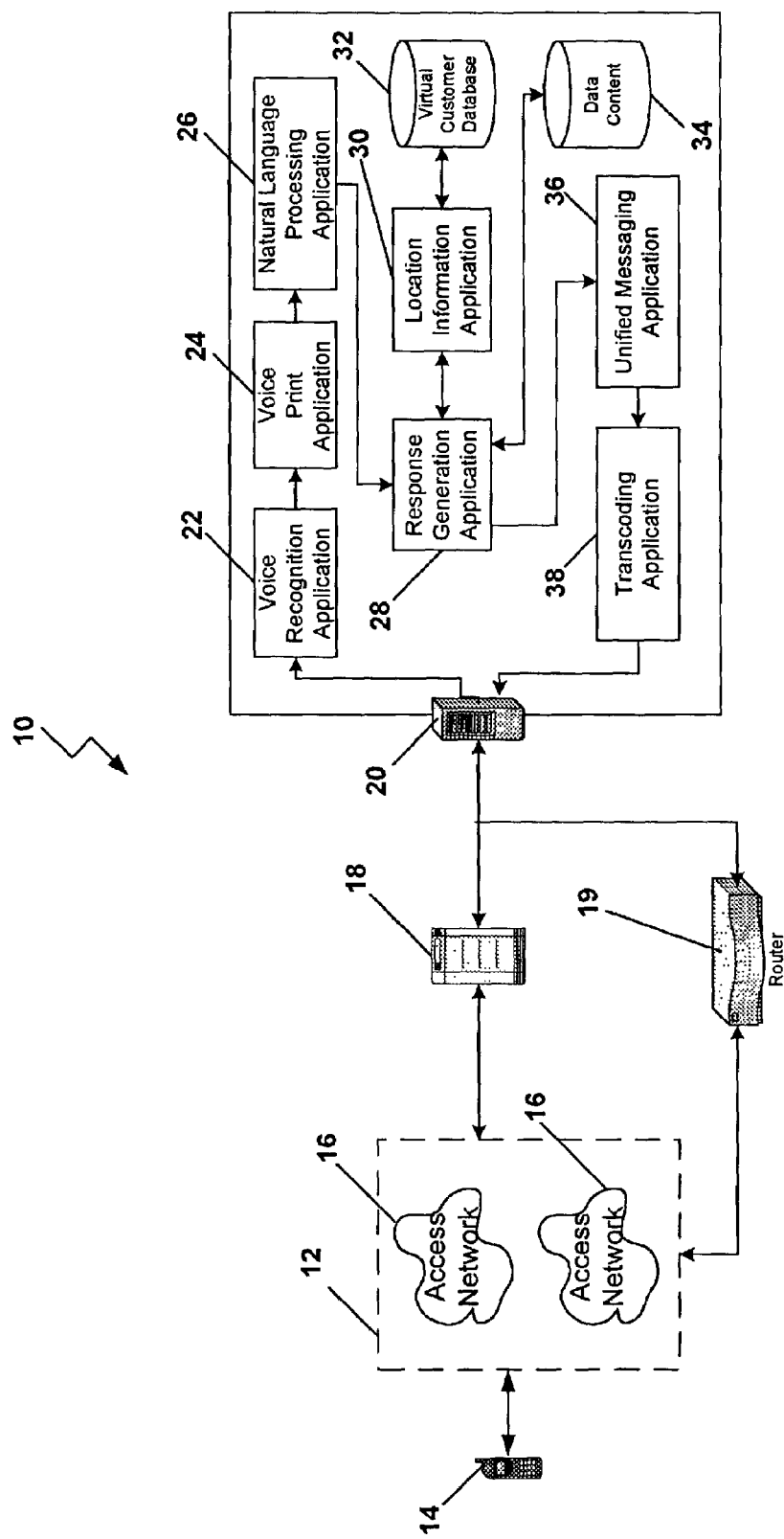
FIG. 1 illustrates a preferred embodiment of a multi-modal messaging system for a wireless communication system.

Referring to FIG. 1, the present invention discloses a multi-modal messaging system 10 for a wireless communication system 12. The wireless communication system 12 includes at least one wireless terminal 14 that is connected to at least one wireless access network 16. Although not illustrated, the wireless access network 16 generally includes a base station transceiver that is connected to a base station server. The base station server is connected to a network connection that may be a publicly switched telephone network or a private network. In the embodiment illustrated in FIG. 1, the wireless access network 16 is connected to at least one switch 18, thereby connecting the wireless terminal 14 to a multi-modal message server 20. However, as further illustrated in FIG. 1, the wireless access network 16 could also be connected to a router 19 in an IP-based wireless access network as the function of transferring data between the wireless terminal 14 and the multi-modal message server 20 is provided by both types of devices.

The multi-modal messaging system 10 discloses a method of communicating with a wireless terminal 14 using multiple modes of communication including, but not limited to, human speech and text-based messages during a single transaction or call. As set forth in detail below, wireless terminals 14 that are connected to the wireless access network 16 preferentially communicate with the multi-modal message server 20 via the wireless access network 16 to which the wireless terminal 14 is connected. Preferentially, the multi-modal messaging system 10 also includes an automated speech recognition application with which the user of the wireless terminal 14 interacts to request and receive information from various databases containing information from a plurality of businesses.

Referring to FIG. 1, during operation the wireless terminal 14 is capable of transmitting and receiving messages that may come in several formats. The preferred formats include human speech, which is produced using a speaker and a microphone, and text and graphic formats that are generated on a display of the wireless terminal 14. In the preferred embodiment of the present invention, the wireless terminal 14 preferentially transmits a tailored request for information to the multi-modal message server 20 in either human speech or text based message formats. Speech-based tailored requests for information are transmitted by means of a wireless telephone call as known in the art. Text-based tailored requests for information are transmitted in the form of a text message that is transmitted using a wireless communication protocol, including but not limited to a short message service ("SMS"), any wireless application protocol ("WAP"), or any email protocol.

In one preferred embodiment of the present invention, a user of the wireless terminal 14 establishes a connection with the multi-modal message server 20 by dialing a phone number that is associated with a participating company that operates the multi-modal message server 20. The act of dialing a predefined phone number associated with the multi-modal message server 20 causes the wireless access network 16 to connect the call to the multi-modal message server 20. In yet another preferred embodiment, the user of the wireless terminal 14 is capable of establishing a connection with the multi-modal message server 20 from an interactive menu that is generated on the wireless terminal 14 through a wireless application protocol or by predefined user or factory settings. Selecting a link or prompt to a respective multi-modal message server 20 contained in the interaction menu thereby establishes the connection between the remote terminal 14 and the multi-modal message server 20. In yet another preferred embodiment, the user may enter an address or universal resource locator ("URL") of the multi-modal message server 20 to establish the connection between the wireless terminal 14 and the multi-modal message server 20.

Although not specifically illustrated, the operator of the multi-modal message server 20 may or may not be the actual company from which data is sought by the user of the wireless terminal 14. The company operating the multi-modal message server 20 may be a third-party that is licensed or granted permission to provide certain types of data to consumers having remote terminals 14 that are associated with the company operating the multi-modal messaging system 10. For example, the provider of the wireless communication system 12 may have a contract with the operator of the multi-modal message server 20 and in turn, another company from which the user is seeking information may also have a contract with the operator of multi-modal message server 20. The cooperation of all parties in these embodiments enables the multi-modal messaging system 10 to function properly despite the varying types of contractual arrangements made between respective parties. Further, the multi-modal message server 20 may house the data files that contain the information requested by the user or the multi-modal message server 20 may be connected to several different company file servers that contain the desired information that is responsive to the requests for information that are generated by the wireless terminals 14.

In response to the requests for information that are generated by the wireless terminal 14, the multi-modal message server 20 generates structured responses that contain data that is responsive to the requests for information. In transmitting the structured responses to the wireless terminal 14, the multi-modal messaging system 10 can select from a group of modes of communication including, but not limited to, text modes, graphic modes, animation modes, multi-media modes, pre-recorded and synthesized sounds including synthesized human speech modes, music modes, and noise modes. In particular, the preferred multi-modal messaging system 10 uses at least two of the above-referenced modes to transmit responses to the wireless terminals 14 during a single transaction or user interaction.

As set forth above, the methods and protocols for transmitting information in the form of text from the multi-modal messaging system 10 to the wireless terminal 14 include, but are not limited to, SMSs, WAPs, and email protocols. In the case of audible information, the response is preferentially transmitted from the multi-modal message server 20 to the remote terminal 14 during a wireless telephone call that may be initiated by either the remote terminal 14 or the multi-modal message server 20. In yet another preferred embodiment of the present invention, the audible information contained in a response may be transmitted in an automated fashion using applications capable of synthesizing human speech and directing the synthesized human speech to a voice mail system associated with the intended recipient's wireless terminal 14. As used herein, the term voice mail system includes any system that is capable of receiving, storing and retrieving audible messages in an automated fashion either autonomously or on-demand via a telephone network. These include voice mail servers and both analog and digital answering machines.

As set forth above, the present invention discloses the use of more than one mode of communication during the course of a single interaction between the wireless terminal 14 and the multi-modal message server 20. A single interaction is defined as a set of messages required to meet the needs of a consumer or user of the wireless terminal 14 that is requesting a specific service, specific content, or specific information from the multi-modal message server 20 and the response or responses that are delivered by the multi-modal message server 20 in response to the requests for information from the wireless terminal 14. The present invention discloses methods of using multiple modes of communication between a respective remote terminal 14 and a respective multi-modal message server 20 during a single interaction, thereby allowing the multi-modal message server 20 to respond to the demands of the user using both voice and text-based messages, for example.

As set forth above, during operation the wireless terminal 14 is operable to generate tailored requests for information about a particular product or service. In the preferred embodiment, the multi-modal message server 20 responds to the wireless terminal 14 by sending content responsive to the tailored requests for information via messages that are formatted as a text-based message and a voice-based message. In other embodiments, the wireless terminal 14 may only be capable of conducting a wireless telephone call or the transmission or receipt of text messages, but not both operations at the same time. As such, in these embodiments of the present invention the multi-modal messaging system 10 is designed to provide the wireless terminal 14 with text-based messages that are responsive to the requests for information after the wireless telephone call has been disconnected and the user has already received the voice-based messages that are responsive to the requests for information. In addition, the voice call connection between the wireless terminal 14 and the multi-modal message server 20 and the text-based messages that are sent to the wireless terminal 14 may be transmitted from the multi-modal message server 20 using a dissimilar wireless communication protocol.

The multi-modal messaging system 10 preferentially also includes a voice recognition application 22. The voice recognition application 22 is preferentially located on the multi-modal message server 20, but may also be located on a separate server that is connected with the multi-modal message server 20. The voice recognition application 22 determines the identity of or recognizes respective words that are contained in voice-based requests for information that are generated by users of the wireless terminal 14. The words that are identified by the voice recognition application 22 are used as inputs to a response generation application 28 in one preferred embodiment of the present invention. As set forth in greater detail below, the response generation application 28 is capable of generating multi-modal responses that contain data responsive to the requests for information that are generated by the users of the wireless terminal 14. As further set forth in detail below, the words that are identified may also be used as an input to a natural language processing application 26 that determines the intent of the words contained in the requests for information and not just the identity of the words.

In another preferred embodiment of present invention, the multi-modal messaging system 10 includes a voice print application 24 that provides security to users of the wireless terminals 14 by analyzing voice prints of the user that are obtained by sampling segments of the user's speech. If the user is authenticated, access to the multi-modal messaging service 10 is provided to the user and if the user is not authenticated access is denied. Further, if the user desires to limit access to the multi-modal messaging system 10 to only themselves or select individuals, then a preference setting may be set by the owner of the wireless terminal 14 that restricts access to only pre-authorized users. The voice print application 24 can also be used to limit use of the wireless terminal 14 so that if the remote terminal 14 is stolen it will not be able to be used by the person who steals the wireless terminal 14. The voice print application 24 can also be used to determine if the user is an authorized user that can be provided with information related to a specific account by providing authorization and authentication. The voice print application 24 can be located on the multi-modal message server 20 or on a voice print application server that is connected to the multi-modal message server 20.

As briefly set forth above, in yet another preferred embodiment of the present invention the multi-modal messaging system 10 includes a natural language processing application 26. The natural language processing application 26 works in conjunction with the voice recognition application 22 to ascertain the meaning of natural language requests for information that are received from the wireless terminals 14. The natural language processing application 26 processes the identified words contained in the voice signals to ascertain the meaning or intent of the words that are contained in the voice signals. As such, during operation the voice recognition application 22 identifies or recognizes the particular words that are contained in the voice signals and the natural language processing application 26 interprets the meaning or intent of the recognized words contained in the voice signals. The natural language processing application 26 provides functionality to the multi-modal messaging system 10 that allows users to enter requests for information using natural language that is normally used in conversations between two human subjects.

The natural language processing application 26 may be located on the multi-modal message server 20, but, in an effort to increase the level of performance, could also be located on a separate server or a separate set of servers connected with the multi-modal message server 20. For a more detailed discussion of the preferred natural language processing application please refer to U.S. application Ser. No.: 10/131,898 entitled Natural Language Processing for a Location-Based Services System filed on Apr. 25, 2002 which is hereby incorporated by reference in its entirety.

As illustrated in FIG. 1, the natural language processing application 26 is connected to a response generation application 28 that uses a plurality of programmed rules in combination with the command or word contained in the request to determine what information should be retrieved and returned to the wireless terminal 14. The response generation application 28 uses the words identified by the voice recognition application 22 and the intent or meaning of the words determined by the natural language processing application 26 to generate a search query that retrieves the appropriate information from a content database 34. In other preferred embodiments, only the words identified from the voice recognition application 22 are used by the response generation application 28 to generate a response to the tailored requests for information.

In another preferred embodiment of the multi-modal messaging system 10, a location information application 30 is used to determine a geographic location of the wireless terminal 14. The location information application 30 may be located on the multi-modal message server 20 or on another server that is connected to the multi-modal message server 20. The geographic location of the user can be used to focus or narrow responses that are generated by the response generation application 28 to a specific geographic area that is appropriate to the user of the wireless terminal 14. Certain types of requests for information generated by users of the wireless terminals 14 will be dependent on the current geographic location of the wireless terminal 14 and the location information application 30 is used to provide the response generation application 28 with location data that is needed to generate a geographically tailored response to requests for information that are dependent on the geographic location of the wireless terminal 14.

The response generation application 28 may also be connected to a virtual customer database 32 that may use application and customer proprietary information to determine user preferences for modes of communication. In addition, the virtual customer database 32 may include customer data that includes information about the wireless terminal 14 that the user is using such as limitations for the amount or type of data content that the wireless terminal 14 can receive or the type of display used by the wireless terminal 14 so that responses can be structured in a format that is compatible with the display. In addition, the user may choose not to receive certain types of large files, such as multimedia files and so forth, and these settings may be found in the virtual customer database 32 in the profile of the user.

As set forth above, the response generation application 28 is used to generate structured responses to the tailored requests for information that are generated by the wireless terminal 14. Once the customer preferences and identification have been determined using the virtual customer database 32 and possibly the geographic location of the wireless terminal 14 has been determined using the location information application 30, a query is generated and sent to the content database 34 that is connected to the response generation application 28. The query is used to retrieve data that is responsive to the request for information from the content database 34. The content database 34 may be located locally on the multi-modal message server 20 or housed on other servers that are connected to the multi-modal message server 20. For example, if the wireless terminal 14 is connected to a multi-modal message server 20 provided by an airline company, the details of a flight that a user is booked on may be retrieved from the content database 34 if so desired.

Expanding on the example set forth above, let's say that the user of the wireless terminal 14 is a regular customer of the airline company and is registered with the airline company. The virtual customer database 32 will know this fact and will assist the response generation application 28 by providing detailed information to the response generation application 28 about that particular user. For example, the virtual customer database 32 may contain a customer identification number and a virtual key that is associated with that particular user. This information can be added to the query that is generated by the response generation application 28, which allows the response generation application to more accurately generate responses. The airline company multi-modal messaging system will be able to use this information to more accurately provide responses to the user that contain accurate data related to that particular user's account and status. Further, this information can be used for authorization and authentication purposes.

Once the data for the response to the user's request has been located by the response generation application 28, the multi-modal messaging system 10 prepares this data for transmission to the wireless terminal 14. A unified messaging application 36 preferentially combines the information retrieved into a unified response that can be sent to the wireless terminal 14 if the response generation application 28 does not format the response into the predefined message formats. In a preferred embodiment, the unified response that is generated contains a text-based response and a voice-based response that is created using the data that is provided by the response generation application 28. In essence, the unified message application 36 prepares the multi-modal response by generating a response in at least two formats that are suitable for the wireless terminal 14. As set forth above, these formats may include a text-based message, a graphics-based message, a voicemail message, and an email message.

After the unified message is created, a transcoding application 38 may be used to format the unified message into a format that is suitable for the wireless terminal 14 using information already known about the wireless terminal 14, which is preferentially retrieved from the virtual customer database 32. For example, for a text-based message, the transcoding application 38 may convert the text-based response into an SMS or WAP format For a voice-based message, the transcoding application 38 may use a voice synthesis application to convert the speech-based response into a format suitable for the wireless terminal 14. The response is then sent to the wireless access network 16, which thereby transmits the multi-modal response to the wireless terminal 14.

Users of the wireless terminals 14 can define how they want the multi-modal messaging system 10 to send responses to them, or the multi-modal messaging system 10 may contain information, preferably stored in the virtual customer database 32, about each user of the multi-modal messaging system 10 and their respective remote terminals 14. This allows the multi-modal messaging system 10 to generate and transmit responses that are in the preferred format of the user. The multi-modal messaging system 10 allows users to determine what types of services and modes of communication will be used to transmit responses to the wireless terminal 14.

Referring to FIG. 1, in the preferred embodiment of the present invention a call is placed on the wireless access network 16 from the wireless terminal 14 to the multi-modal message server 20. In other preferred embodiments, a connection may be established between the wireless terminal 14 and the multi-modal message server 20 through the selection of a menu item or the entry of an address on the wireless terminal 14. The wireless terminal 14 also preferentially passes information to the multi-modal message server 20 about the wireless terminal 14 using SS7, ISDN, or other in-band or out-of-band messaging protocols. A calling number identification ("CNI") is preferentially passed as well as a serial number for the wireless terminal 14. This information can be used to determine the identity of the user to which the wireless terminal 14 belongs.

In one preferred embodiment, the multi-modal message server 20 uses an interface to detect the call and 'answers' the call from the wireless terminal 14 using text-to-speech messages or recorded speech prompts. The prompts can ask the user to speak the request for information using some set of predefined commands or may ask the user to utter the request for information using natural language, which will later be processed by the voice recognition application 22 and the natural language application 26. The text-to-speech messages or recorded speech prompts are transmitted across the wireless access network 16 to the wireless terminal 14.

During operation, the user speaks the request for information into the wireless terminal 14 and the wireless terminal 14 and wireless access network 16 transmit the voice signal representing the request for information to the multi-modal message server 20. Under one mode of operation, the user speaks one of a pre-defined command phrases or words, which is then interpreted and used by the voice recognition application 22 to generate a response. The user's speech is converted to text using the voice recognition application 22, which is then used as an input to a search query that interprets the user's command. As set forth below, based on the user's command, a response is generated by the responses generation application 28 that is sent to the user.

In one embodiment of the present invention, the multi-modal messaging system 10 incorporates a voice printing application 24 in conjunction with the database of proprietary customer information 34 to determine if the caller using the wireless terminal 14 is the owner of (or assigned to) the wireless terminal 14. If the caller is not the owner of the wireless terminal 14, (which may occur if someone borrows the wireless terminal 14 from the owner) the multi-modal messaging system 10 proceeds with the call but does not personalize any of the services based on proprietary customer information associated with the assigned user. Therefore, at any point in the process where the multi-modal messaging system 10 would use customer proprietary information, the multi-modal messaging system 10 could use additional prompts to request this information from the caller. The multi-modal messaging system 10 could also restrict access to the multi-modal messaging system 10 and the wireless terminal 14 altogether if the assigned user has preset a user preference indicating the restriction of access to unauthorized users.

In another preferred embodiment of the present invention, the multi-modal messaging system 10 can handle requests for information that are entered using natural speech. In this embodiment, the multi-modal messaging system 10 passes the text identified from the voice recognition application 22 to a natural language processing application 26 that is used to determine the intent or meaning of the words contained in the request. The interpreted intent is processed by the multi-modal messaging system 10 in the same way the pre-defined commands are processed. This is made possible because the natural language processing application 26 is programmed to generate search queries based on the words identified in the request and the intent of the words contained in the request.

The response generation application 28 uses programmed rules in combination with the commands to determine what information should be retrieved and returned to the wireless terminal 14. These rules are stored in executable code or in a content database 34. In one preferred embodiment of the present invention, if the multi-modal messaging system 10 determines that location information about the wireless terminal 14 is necessary to generate an appropriate response to the request for information, the multi-modal messaging system 10 uses the location information application 30 to determine the geographic location of the wireless terminal 14. The wireless access network 16 can use several location determining applications that are designed to sufficiently determine the geographic location of the wireless terminal 14 to the accuracy necessary to successfully generate a response that is responsive to the request for information. The location information that is generated by the location information application 30 is used as part of the search query that is used to locate the desired information.

Upon determining the data to be returned to the wireless terminal 14 and retrieving this data from a content database 34, the response generation application 28 of the multi-modal messaging system 10 prepares the content to be sent to the wireless terminal 14. The multi-modal messaging system 10 may use an application and customer proprietary information to determine the customer's preferences for modes of communication. Additionally, this customer data may include information about the wireless terminal 14 assigned to the user such as limitations for the amount or type of data content the device can receive. These methods for storing and accessing the customer proprietary data include those disclosed in a co-pending application entitled Virtual Customer Database, which was filed on the same day as the present application and assigned application Ser. No.: 10/264,219, which is hereby incorporated by reference in its entirety.

The multi-modal messaging system 10 formats the content contained in the response for the wireless terminal 14 using available information about the wireless terminal 14 and individual preferences of the users. A unified messaging application 36 preferentially formats the content into multiple messages, if necessary, to respond to the wireless terminal 14 in the most informative way that is compatible with the wireless terminal 14 to which the user is assigned or has purchased. The multi-modal messaging system 10 preferentially uses a transcoding application 38 to format the content contained in the response into a suitable format for the user's wireless terminal 14 and is capable of generating responses using formats such as WML, HTML, and plain text.

The multi-modal messaging system 10 then transmits the content to the wireless access network 16 operated by the carrier and indicates the recipient and the method for transferring the message(s) to the recipient or user. Preferably, the messages are sent as a text message to the wireless terminal 14 using any of (but not limited to) the following: SMS, CPDP, Mobitex. The wireless terminal 14 receives the message(s) and the user is allowed to interact with the content contained in the response from the multi-modal messaging system 10.

In yet another preferred embodiment of the present invention, the multi-modal messaging system 10 is used in combination with a location-based services system where the content of the messages between the system and the wireless terminal 14 contain information that is based on the current geographic location of the wireless terminal 14. The location-based services system may be of the type by which the indicator of the location of the wireless terminal 14 is generated by the wireless terminal 14 and transmitted to the multi-modal messaging system 10, determined by the multi-modal messaging system 10, or by some combination there of. For a more detailed description of location-based service systems, refer to U.S. application Ser. No.: 09/946,111, which was filed on Sep. 4, 2002 entitled Location-Based Services and is hereby incorporated by reference in its entirety.

Figure 2:
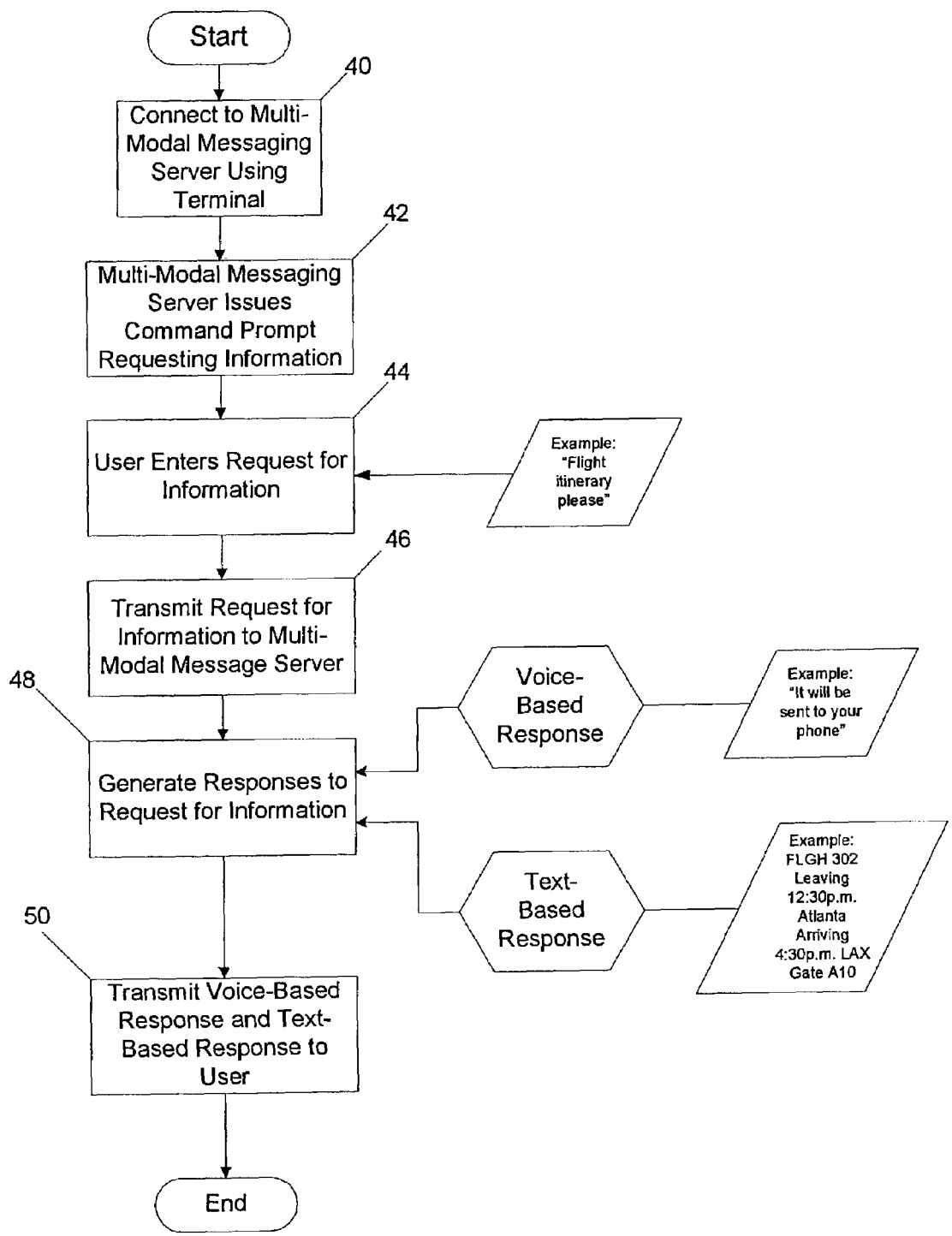
FIG. 2 illustrates the general process steps performed by a preferred embodiment the multi-modal messaging system during an illustrative operation.

Referring to FIG. 2, an illustrative example of a preferred embodiment of the present invention is set forth below. As an example, let's say that a user of wireless terminal 14 is planning a trip and would like to check with his or her airline to determine their flight itinerary. At step 40 the user of wireless terminal 14 connects to the multi-modal messaging system 10 of the airline through the wireless access network 16. At step 42, the multi-modal messaging server 20 transmits a command prompt to the user requesting information from the user of the wireless terminal 14. In response, at step 44 the user states a voice request for information, which in this example is illustrated as "Flight itinerary please", which is transmitted to the multi-modal messaging server 20 at step 46.

At step 48, the multi-modal messaging system 10 takes this voice request for information and uses automated speech recognition, which in the preferred embodiment includes processing the voice request for information with a voice recognition application 22 and a natural language processing application 26, to generate a plurality of responses to the request for information. As an example, in the preferred embodiment illustrated in FIG. 2, a voice-based response is generated that states "It will be sent to your phone" and a text-based response is generated that provides the user with the appropriate itinerary information that is tailored for that particular user. At step 50, the multi-modal message server 20 transmits the multi-modal response to the user, which in FIG. 2 is represented as a voice-based response and a text-based response.

To generate the response, the preferred embodiment uses customer information that is received from the virtual customer database 32 to determine that the user of the wireless terminal 14 has a profile with the airline. The profile is capable of providing the user's customer ID and possibly a virtual key that is associated with that customer that authorizes the wireless terminal 14 to receive data from the airline's database. This information allows the multi-modal messaging system 10 to authenticate and identify the user of the wireless terminal 14 in order to generate an appropriate response from the airline's data files.

The wireless terminal 14 is also capable of responding to the multi-modal message. The user of the wireless terminal 14 can respond to the multi-modal message using several different response methods including voice, keypad selections, touchscreen selections and so forth. In response to the user's response, the multi-modal message server 20 is capable of generating another multi-modal message that may be sent to the wireless terminal 14. For example, a text response sent to the wireless terminal 14 states "Your flight leaves at 5 pm and your seat is 45B. An upgrade to 1 st class is available. Reply to this message for more information." By replying to the message, the multi-modal message server 20 can generate another multi-modal message that provides the details of upgrading to first class. Other scenarios are available and the above-referenced example should be construed as illustrative and not in a restrictive sense.

While the invention has been described in its currently best-known modes of operation and embodiments, other modes, embodiments and advantages of the present invention will be apparent to those skilled in the art and are contemplated herein.

What is claimed is:

1. A multi-modal messaging system for connection to a wireless terminal through a wireless access network, comprising:
   a multi-modal message server connected to said wireless access network, said server being operable to receive a voice request for information related to a particular product or service from said wireless terminal;
   a voice recognition application operable to identify a plurality of words contained in said voice request for information;
   a content database configured to store information that may be responsive to said voice request for information;
   a response generation application operable to access said content database to generate a first format response and a second format response that correspond to an identity of said wireless terminal and that each contains data responsive to said voice request for information; and
   wherein said first format response and said second format response are transmitted to said wireless terminal.

2. The multi-modal messaging system of claim 1, wherein said voice request for information is in the form of a natural language statement.

3. The multi-modal messaging system of claim 2, further comprising a natural language processing application operable to interpret an intent associated with said voice request for information.

4. The multi-modal messaging system of claim 1, further comprising a location information application for generating a geographic location indication of said wireless terminal, wherein said first and second response is based at least in part on the geographic location indication of said wireless terminal.

5. The multi-modal messaging system of claim 1, further comprising a virtual customer database connected to said multi-modal message server for providing a profile of said wireless terminal.

6. The multi-modal messaging system of claim 5, wherein said profile includes a customer identification.

7. The multi-modal messaging system of claim 5, wherein said profile includes a device characteristic indication associated with said wireless terminal.

8. The multi-modal messaging system of claim 7, wherein said device characteristic indication allows said first and second response to be generated in a format compatible with said wireless terminal.

9. The multi-modal messaging system of claim 1, wherein said first response comprises a voice-based response.

10. The multi-modal messaging system of claim 9, wherein said second response comprises a text-based response.

11. The multi-modal messaging system of claim 10, further comprising a transcoding application for formatting said text-based response into a protocol capable of being displayed on a display of said wireless terminal in a format that is compatible with said display of said wireless terminal.

12. The multi-modal messaging system of claim 1, wherein said first and second response may be selected from a group of responses consisting of a voice-based response, a text-based response, a voice-mail response, an instant message response, an email response or a fax response.

13. The multi-modal messaging system of claim 1, wherein said response generation application is further operable to provide the second response after communication to provide the first response is complete.

14. The multi-modal messaging system of claim 1, wherein said request for information is a request for a specific service, a request for specific content, or a request for specific information.

15. The multi-modal messaging system of claim 1, wherein said response generation application is further operable to retrieve a data file from the content database that is responsive to the request, or retrieve information response to the request from a different company file server.

16. The multi-modal messaging system of claim 1, wherein said response generation application is further operable to use only words identified by said voice recognition application to generate said response.

17. The multi-modal messaging system of claim 1, further comprising a voice print application configured to analyze speech patterns of said voice request for information and limit access to said content database responsive to the analysis of the speech patterns.

18. A multi-modal messaging system for a wireless communication system for connection to a wireless terminal through a wireless access network, comprising:
    a multi-modal message server connected to said wireless access network and configured to receive a natural language voice request for information related to a product or a service;
    a voice recognition application operable to identify a plurality of words contained in said natural language voice request for information;
    a natural language processing application operable to determine an intent associated with said words identified in said natural language voice request for information;
    a content database configured to store information that may be responsive to said voice request for information;
    a response generation application operable to access said content database, and generate a response to said natural language voice request for information that is based at least in part on the identity of said words and the intent of said words, and is responsive to said request;
    a unified messaging application operable to interpret said response and generate a first response in a first message format and a second response in a second message format that correspond to an identity of said wireless terminal; and
    wherein said first response message and said second response message are sequentially transmitted to said wireless terminal.

19. The multi-modal messaging system of claim 18, wherein said unified messaging application further generates a third response in a third message format, wherein said third response message is transmitted to a second terminal.

20. The multi-modal messaging system of claim 19, wherein said second terminal is an email server.

21. The multi-modal messaging system of claim 19, wherein said second terminal is a voice mail device.

22. The multi-modal messaging system of claim 19, wherein said second terminal is a computer terminal having an instant message application, wherein said third message format is an instant message addressed to said instant message application of said second terminal.

23. The multi-modal messaging system of claim 18, wherein said multi-modal message server is responsive to a call connected with said multi-modal message server by said wireless terminal.

24. The multi-modal messaging system of claim 18, wherein said multi-modal message server is responsive to a connection established with said multi-modal message server by selection from an interactive menu of said wireless terminal.

25. The multi-modal messaging system of claim 18, wherein said multi-modal message server is responsive to a connection established with said multi-modal message server by entry of an address of said multi-modal message server with said wireless terminal.

26. The multi-modal messaging system of claim 18, wherein said receipt of said request, and generation and transmittal of said response occur during a single interaction between said multimodal message server and said wireless terminal.

27. The multi-modal messaging system of claim 18, wherein the response generation application is further operable to generate a search query to retrieve the data responsive to said request from said content database.

28. The multi-modal messaging system of claim 18, wherein said response generation application is further operable to execute programmed rules stored in said content database to determine what information to retrieve that will be responsive to said request.

29. The multi-modal messaging system of claim 18, wherein said response generation application is further operable to determine when geographic location information of said wireless terminal is needed to generate a response that is responsive to said request, obtain said geographic location information, and use said obtained geographic location information in a query to obtain information from said content database that is responsive to said request.

30. The multi-modal messaging system of claim 18, further comprising a voice a voice print application configured to analyze speech patterns of said voice request for information and limit access to said content database responsive to the analysis of the speech patterns.

31. A multi-modal messaging system for connection to a wireless terminal trough an access network, comprising:
  a multi-modal message server connected to said access network;
  a content database configured to store information that may be responsive to a voice request for information related to a product or a service; and
  a response generation application located on said multi-modal message server that is operable to access said format content database to retrieve data useable to generate a first and a second format response to said request for information that corresponds to an identity of said wireless terminal;
  wherein said first format and said second format response include data responsive to said request, and are sequentially transmitted to said terminal.

32. The multi-modal messaging system of claim 31, wherein said response to said request for information is generated by searching a participating company database containing a plurality of records with information responsive to said request for information.

33. The multi-modal messaging system of claim 32, wherein said participating company database is located on a participating company server connected to said multi-modal message server.

34. The multi-modal messaging system of claim 31, further comprising a voice print application configured to analyze speech patterns of said voice request for information and limit access to said content database responsive to the analysis of the speech patterns.

35. A multi-modal system for interacting with a wireless communications device, the system comprising:
  a message server configured to receive a request for information related to a product or service from a wireless communication device;
  a voice recognition application configured to identify a plurality of words contained in said voice request for information and convert said plurality of words into a text message;
  a content database configured to store information that may be responsive to said voice request for information; and and
  a response generation application configured to generate a query to said content database, based on said text message, to retrieve data responsive to said text message, said response generation application further configured to generate a voice response and a non-audible response to said voice request for information that corresponds to an identity of said wireless communication device, and are based on said retrieved data.

36. The multi-modal messaging system of claim 35, further comprising a voice print application configured to analyze speech patterns of said voice request and limit access to the content database responsive to the analysis of the speech patterns.

* * * * *

UNITED STATES PATENT AND TRADEMARK OFFICE
CERTIFICATE OF CORRECTION

PATENT NO. : 7,254,384 B2
APPLICATION NO. : 10/263523
DATED : August 7, 2007
INVENTOR(S) : Michael L. Gailey, Eric A. Portman and Michael J. Burgiss It is certified that error appears in the above-identified patent and that said Letters Patent is hereby corrected as shown below:

On the Title Page,

Item (56) – References Cited, Page 2
Delete "6,726,758 B2" before "4/2004 Sato" and insert -- 6,728,758 B2 --.

Column 9
Line 38, insert a period after "format".

Column 15
Line 37, delete "trough" and insert -- through --.

Signed and Sealed this

Sixth Day of November, 2007

JON W. DUDAS
*Director of the United States Patent and Trademark Office*